No. 794,642.

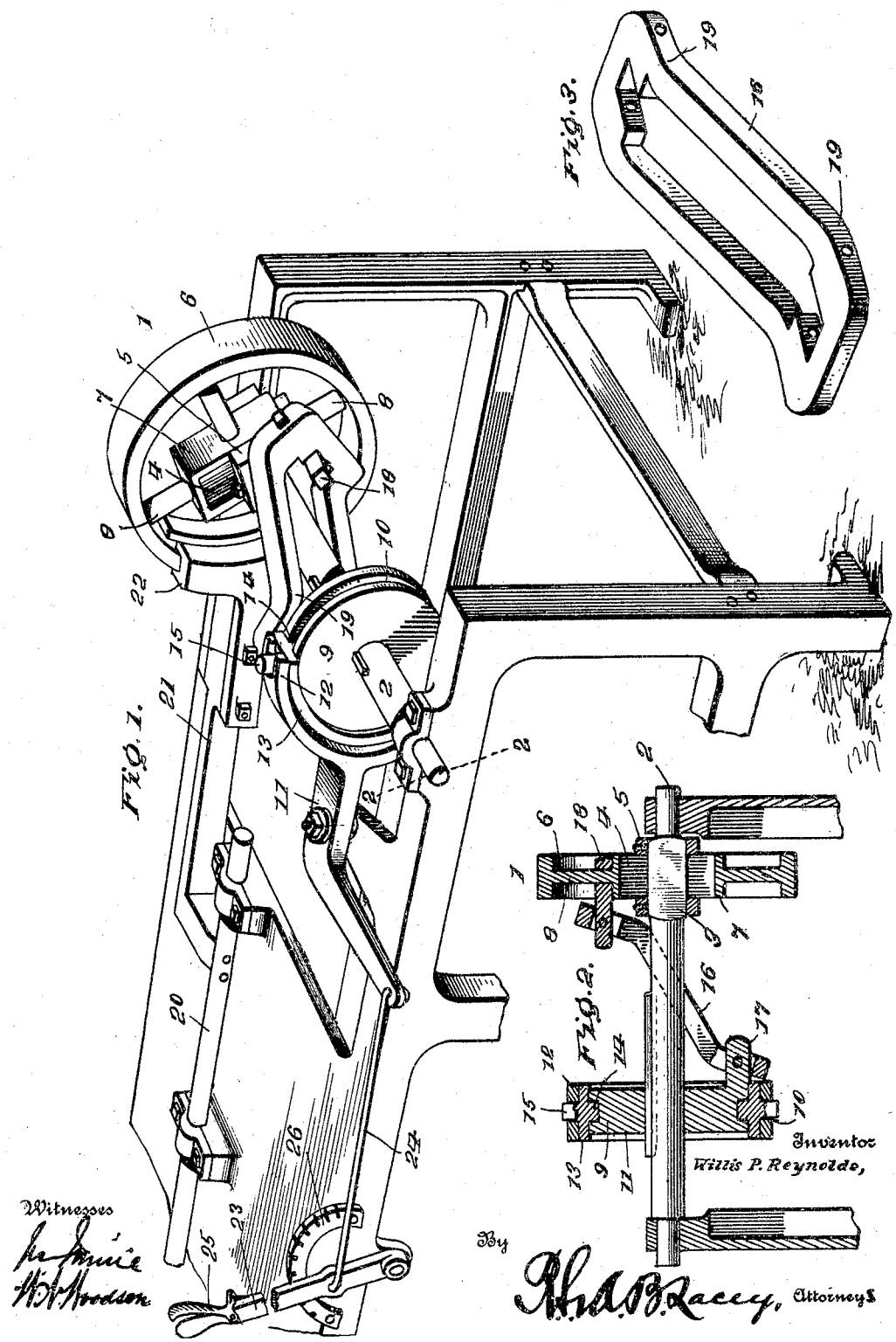

Patented July 11, 1905.

UNITED STATES PATENT OFFICE.

WILLIS P. REYNOLDS, OF FITHIAN, ILLINOIS.

VALVE-GEAR.

SPECIFICATION forming part of Letters Patent No. 794,642, dated July 11, 1905.

Application filed November 2, 1904. Serial No. 231,142.

*To all whom it may concern:*

Be it known that I, WILLIS P. REYNOLDS, a citizen of the United States, residing at Fithian, in the county of Vermilion and State of Illinois, have invented certain new and useful Improvements in Reversing Valve-Gears, of which the following is a specification.

The primary object of the invention is to devise a shifting eccentric of novel structure specially designed for locomotive-engines to provide for a quick reverse or cut-off, as may be required.

It is not the intention to restrict the use of the invention, as it is contemplated to adapt it to shifting eccentrics wherever employed in operating machinery or mechanism.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a reversing valve-gear embodying the invention. Fig. 2 is a plan section thereof. Fig. 3 is a detail view of the link.

Corresponding and like parts are referred to in the following description and indicated in all the views of the drawings by the same reference characters.

The eccentric 1 is slidably mounted upon the shaft 2 to vary its eccentricity with reference thereto and is held upon the shaft in such a manner as to rotate therewith, but prevented from moving lengthwise thereon. The eccentric may be mounted on the shaft in any determinate way so long as it possesses the characteristics herein enumerated. As shown, the shaft 2 is provided with a square or angular portion 3, which is passed through a diametrical slot 4 of the eccentric 1. Set-collars 5 are secured upon the square portion 3 and are arranged at opposite sides of the eccentric, so as to prevent any play thereof lengthwise of the shaft. The eccentric comprises a rim 6 and an oblong hub 7, the latter being formed with the diametrical slot 4. Arms or spokes 8 connect the hub 7 with the rim 6. While the construction of the eccentric disclosed is preferred, it is to be understood that it may have any form, so long as it embodies the diametrical slot 4 and rim 6, which are deemed essential features.

The actuator 9 for operating the eccentric is slidably mounted upon the shaft 2 and consists of a disk or wheel having a groove 10 in its periphery. A shipper-lever 11 is connected at one end with the actuator 9 in such a manner as to move same upon the shaft toward and from the eccentric, whereby the latter is shifted to increase or decrease its eccentricity with reference to the axis of the shaft 2. One end of the shipper-lever 11 is forked, as shown at 12, the forked terminals having connection with the actuator 9 in any manner as to cause both the lever and actuator to have a synchronous movement. In the preferable construction a saddle 13 of approximately semicircular form is fitted to the actuator 9 and has a tongue 14 upon its inner face to enter the peripheral groove 10 and is provided at its ends with outer trunnions 15, fitted into openings at the ends of said fork members.

Suitable connecting means are interposed between the actuator and eccentric for transmitting motion from one to the other. As shown, these means consist of a link 16 and wrist-pins 17 and 18. The link 16 has an oblique arrangement and is pivotally connected at its ends to the respective wrist-pins. The end portions of the link are oppositely deflected, as indicated at 19, to transmit motion with a minimum amount of resistance. The link comprises companion longitudinal members and end bars, the longitudinal members being disposed upon opposite sides of the shaft 2, so as to equalize the stress. The wrist-pins 17 and 18 are of square or angular formation and snugly fit openings in the end bars of the link of corresponding shape. In order to insure positive movement of the parts in each direction and to allow for the change of angle of the link with reference to the parts 1 and 9, said link is pivotally connected at its ends to the wrist-pins.

The valve-rod 20 is connected to the bar or rod 21, provided with the shoes 22 in any manner. The valve-rod 20 is representative of the part to which movement is to be imparted from the eccentric. The shoes 22 are attached to opposite sides of the connecting rod or bar 21 and are grooved in their inner faces to receive opposite edge portions of the rim 6, whereby positive thrust is imparted to the element 21 in each direction.

The shipper-lever 11 may be operated in any manner, and for convenience a lever 23 is connected thereto by means of a rod 24 or analogous part, said lever 23 being provided with the usual hand-operated latch 25 for cooperation with a notched segment 26 for securing the lever and connected parts in the adjusted position.

Having thus described the invention, what is claimed as new is—

1. In combination, a shaft having a portion formed with flattened sides, an eccentric having a diametrical slot receiving the flat-sided portion of the shaft and movable radially thereon, means secured to the shaft at each side of the eccentric for preventing movement of the latter lengthwise of the shaft, an actuator axially movable upon said shaft and rotatable therewith, and a link connection between the actuator and eccentric, substantially as set forth.

2. In combination, a shifting eccentric embodying a rim, a connecting-bar, shoes connected to said bar and grooved upon their inner faces to embrace opposite edge portions of the rim of said eccentric, substantially as set forth.

3. In combination, a shaft having a flat-sided portion, a shifting eccentric comprising a rim, oblong hub and a connecting portion between said hub and rim, the hub receiving the flat-sided portion of the shaft, means secured to the shaft at each side of the eccentric to prevent lengthwise movement of the latter on the shaft, an axially-movable actuator rotatable with the shaft, and a link connection between said actuator and eccentric, substantially as specified.

In testimony whereof I affix my signature in presence of two witnesses.

WILLIS P. REYNOLDS. [L. S.]

Witnesses:
LAUREN RASH,
FRED RASH.